United States Patent [19]

Kuzma et al.

[11] Patent Number: 4,616,306
[45] Date of Patent: Oct. 7, 1986

[54] METAL TREATING PROCESS CONTROL

[75] Inventors: Andrew E. Kuzma, Landsdale; James W. Costello, Sellersville; Alexander G. T. Wallace, Ambler, all of Pa.

[73] Assignee: Amchem Products, Inc., Ambler, Pa.

[21] Appl. No.: 639,335

[22] Filed: Aug. 10, 1984

[51] Int. Cl.$^4$ ............................................. G06F 3/00
[52] U.S. Cl. .................................... 364/140; 364/143; 370/77; 118/708
[58] Field of Search ......................... 118/708; 370/77; 364/140–147, 200 MS File, 900 MS File

[56] References Cited

U.S. PATENT DOCUMENTS

| | | | |
|---|---|---|---|
| 3,369,928 | 2/1968 | Arlow | 117/120 |
| 3,515,094 | 6/1970 | McVey | 118/5 |
| 3,607,453 | 9/1971 | Engesser et al. | 148/6.15 Z |
| 3,787,811 | 1/1974 | Hilgedick | 340/163 R |
| 3,952,698 | 4/1976 | Beyer et al. | 118/314 |
| 4,339,794 | 7/1982 | Hideshima | 364/200 |
| 4,374,681 | 2/1983 | Schueneman | 148/6.14 R |
| 4,404,651 | 9/1983 | Grudowski | 364/140 |
| 4,473,889 | 9/1984 | Ross | 364/900 |
| 4,546,469 | 10/1985 | Favrel | 370/77 |

Primary Examiner—Jerry Smith
Assistant Examiner—Allen MacDonald
Attorney, Agent, or Firm—Bernard, Rothwell & Brown

[57] ABSTRACT

Input and output capacity of a continuous cycling programmable controller is increased by utilizing a program which defines a series of timing windows or channels each of which extends for a period greater than a single program cycle. Control switches and sensing switch devices and output LEDS, are divided into channel groups which are energized only during the corresponding channel timing window. Readings of energized input devices are taken during input timing windows which are delayed from and shorter than the corresponding energized window to account for output and input delay and startup and stopping irregularities. Additionally, light indicators are incorporated within a graphic display having an arrangement of baths depicted spatially relative to a corresponding arrangement of control units to enable substantially easier identification of the various control conditions of the process.

24 Claims, 5 Drawing Figures

Microfiche Appendix Included
(2 Microfiche, 75 Pages)

METAL TREATING PROCESS CONTROL

MICROFICHE APPENDIX

Appended hereto are 2 microfiche containing 75 frames which are incorporated by reference herein.

BACKGROUND OF THE INVENTION

1. Field of the Invention

The present invention relates to automatic controls for processes, such as treating processes for metal articles, e.g., cans, automotive bodies, coils, etc., in preparation for subsequent painting or lacquering of the articles.

2. Description of the Prior Art

The prior art as exemplified in U.S. Pat. Nos. 3,369,928, 3,515,094, 3,607,453, 4,374,681, and 3,952,698 contains a number of methods and apparatus for automatically monitoring and controlling bath conditions in metal treating operations. Generally, these prior art methods and apparatus employ electrical control circuits which must be particularly designed for each application. Computerized controls or programmable controllers are utilized in some process control applications; however, where large numbers of inputs and outputs must be connected to the controller, the size of the controller to handle such numbers of inputs and outputs generally results in a substantial increase in cost. Furthermore, the prior art control devices are often subject to being misread with respect to warnings and alarms that may be set off due to the nature of the displays and manner of setting forth the warnings or alarms.

SUMMARY OF THE INVENTION

In a first aspect, the present invention is summarized in a process control apparatus and method utilizing a programmable controller with a continuously cycling program. Condition switches, such as control selection switches, process condition sensing switches, and the like, are connected on one side in groups to corresponding outputs of the controllers which energizes the corresponding output only during the presence of a corresponding channel window. Each switch of each group of switches is connected on its other side together with the corresponding other switches of the other groups to an input such that readings of the input during a window correspond to a single group of switches. The data read during each window is stored in a memory location corresponding to the respective channel and subsequently processed to control the process.

In one preferred embodiment of the invention, the channel windows are determined by corresponding timing count ranges of a timer, and the time of each window corresponds to at least about two program cycles. Further sufficient time is left between successive windows to insure turnoff of energizing voltages and prevent overlapping of voltages due to capacitance and device response time.

In another aspect of the invention, the invention is summarized in a process and apparatus employing a control and display panel wherein a horizontal array of designs depicting the baths and the process extend over a horizontal array of manual control units wherein each design depicting a bath is vertically aligned with or at least spatially associated with respect to the corresponding manual control unit. Each bath design incorporates a corresponding group of indicator lights for enabling the rapid and accurate detection of warning and alarm conditions indicated by various lights.

In a further feature of the invention, program timing channel windows also are utilized to control supply voltages to one sides of corresponding groups of the indicator lights wherein the other side of each indicator light is connected in common with corresponding indicator lights of the other groups to a gating device for selectively energizing the indicator lights in a multiplexed arrangement.

One object of the invention is to produce a relatively inexpensive, reliable and easily arranged control for processes.

One advantage of the invention is that a programmable controller is enabled to utilize its outputs and inputs for multiplexing many times the number of sensing and output devices than is possible by connecting such devices individually to the outputs and inputs.

Another object of the invention is to provide a display from which an operator can more readily detect and identify warning and alarm conditions.

Another advantage of the invention is that arranging a display panel with pictorial representations of baths directly adjacent to manual controls for the particular baths enable an operator to more readily ascertain and identify warning and alarm conditions.

Other objects, advantages and features of the invention will be apparent from the following description of the preferred embodiment taken in conjunction with the accompanying drawings.

DESCRIPTION OF THE PREFERRED EMBODIMENT

Figure 1:
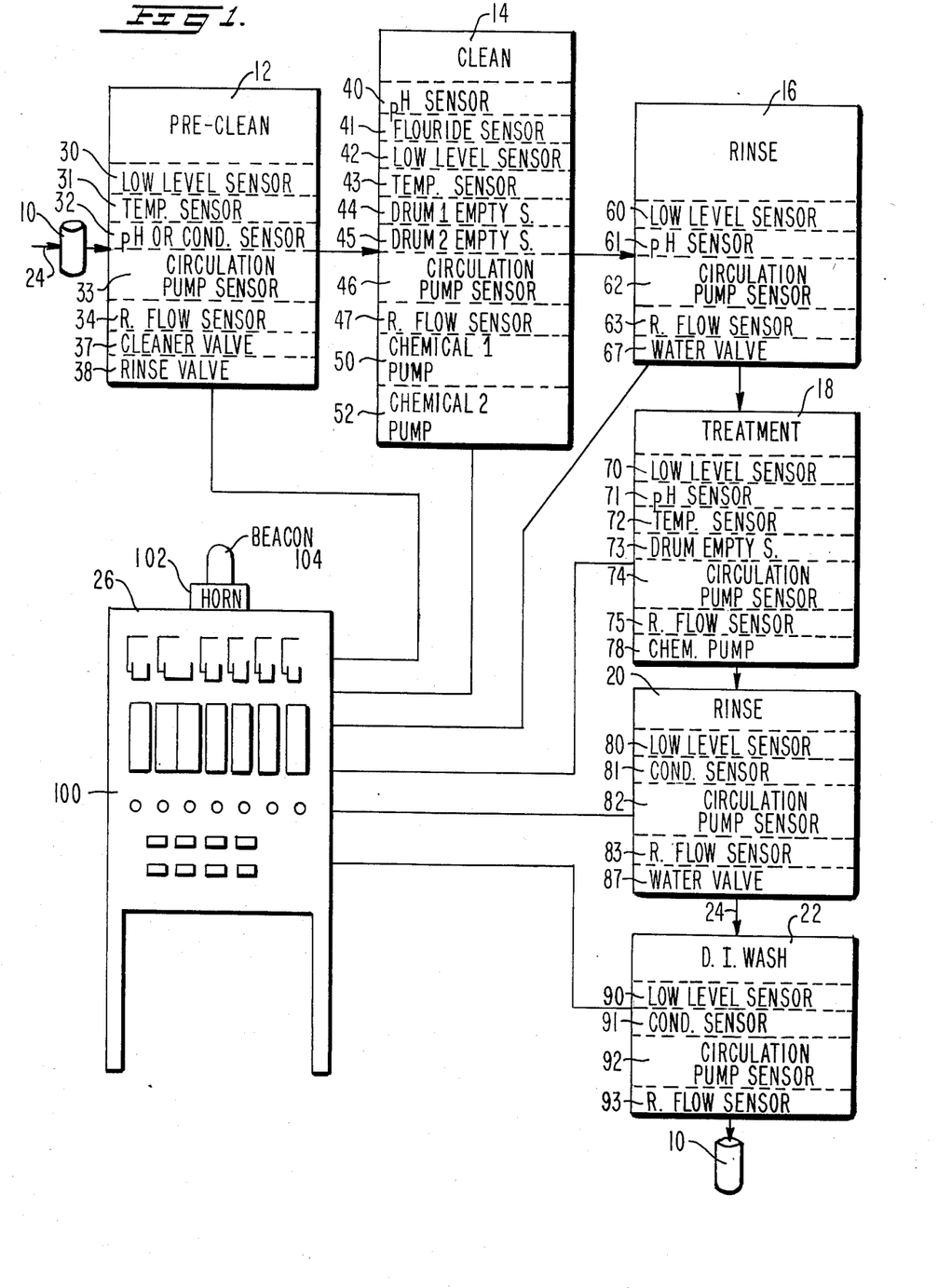
FIG. 1 is a block diagram of a apparatus for treating a metal article.

As illustrated in FIG. 1, an apparatus for treating metal articles, such as cans 10, in accordance with the invention includes a preclean bath 12, a clean bath 14, a rinse bath 16, a treatment bath 18, a rinse bath 20, and a deionized wash bath 22. Conveying means illustrated by the lines and arrows 24 transports the cans 10 in a conventional manner through the baths. A master control unit 26 is connected to various sensors and controls within the baths 12, 14, 16, 18, 20 and 22 to control various conditions of the baths and thus optimize the process. For articles like the illustrated cans 10, the baths employ conventional sprays (not shown) for bathing the inside and outside surfaces of the articles. For other articles, such as automobile bodies, coils, and the like, the conveyor mechanism may immerse the articles into the baths. Additionally, the six baths are illustrated as an example for one proposed can manufacturing line wherein the cans must meet rigid conditions suitable for containing beverages and the like for consumption;

other articles may require less than the illustrated six baths.

The preclean bath 12 generally utilizes water with a small amount of cleaning agent or detergent therein for removing metal filings, debris, and lubricating oils used in manufacture of the cans. Typically, the bath 12 will include a bath level sensor 30, a temperature sensor 31, a pH or conductivity sensor 32, a circulation pump sensor 33 and a riser flow sensor 34. The bath is controlled by a cleaner supply valve 37 and/or a rinse water valve 38.

In the cleaning bath 14, the cans are bathed with solution containing acid and fluoride components to further clean and etch the metal surfaces of the cans to prepare the metal surfaces for reception of protective coatings. The cleaning bath includes a pH sensor 40, a fluoride sensor 41, a bath low level sensor 42, a temperature sensor 43, a first drum or storage tank empty sensor 44 for the acid supply, a second drum or storage tank empty sensor 45 for the flouride supply, a circulation pump sensor 46 and a riser flow sensor 47. Controls in the cleaning bath 14 include a first chemical pump 50 for pumping acid from the first drum or storage tank to the bath, and a second chemical pump 52 for pumping the second chemical or fluoride component from the second drum or storage tank.

The rinsing bath 16 rinses the cans with fresh water to remove the acid and fluoride materials from the cans prior to entering the treatment bath 18. The rinsing bath will include sensors, such as bath low level sensor 60, pH sensor 61, circulation pump sensor 62 and riser flow sensor 63. Controls in the bath 16 include a fresh water valve 67 for adding fresh water to the bath when the bath concentration rises above a preset value.

The treatment bath 18 bathes the cans in a solution containing chemicals for rendering the surface of the aluminum corrosion resistant as well as to produce an adherent surface for subsequent lacquering or painting. A typical treatment will include zirconium or titanium in conjunction with a tannic acid or other ingredients. Sensors within the treatment bath include a bath low level sensor 70, a pH sensor 71, a temperature sensor 72, a drum empty sensor 73, a circulation sensor 74, and a riser flow sensor 75. Controls in the treatment bath 18 include a chemical pump 78 for pumping additional treating solution when the bath concentration becomes lower than the set point.

The rinse bath 20 rinses the cans after treating in the bath 18 with fresh water to remove the treating solution. The bath 80 includes a bath low level sensor 80, a conductivity sensor 81 for detecting when the water is becoming excessively contaminated, a circulation sensor 82, and a riser flow sensor 83. Controls within the rinse bath 20 include a water valve 87 for admitting additional water when the conductivity is too high.

The deionized water wash bath 22 is utilized to remove chemicals from the cans and to leave a clean surface after drying. The wash bath 22 includes a bath low level sensor 90, a conductivity sensor 91, a circulation sensor 92 and a riser flow sensor 93. Deionized water is continuously pumped into the bath 22 to maintain the contaminant level of the bath at a low level. Sensors will detect failure within the bath to signal faulty operation.

The master control unit 26 is in the form of a cabinet with a front door 100. A horn 102 and a beacon 104 are mounted on top of the cabinet. The door 100 contains four horizontally extending panels or horizontal arrays, shown in FIG. 2, including an upper horizontal panel 106 containing designs or pictorial representations 108, 109, 110, 111, 112 and 113 pictorially illustrating the preclean bath 12, the cleaning bath 14, the rinsing bath 16, the treatment bath 18, the rinse bath 20 and the deionized wash bath 22, respectively. A representation or pictorial design 116 of the conveyor extends through the bath designs 108–113 to present a representation of the entire process. Representations 118, 119, 120, 121, 122 and 123 of the circulation pumps for the respective baths 12, 14, 16, 18, 20 and 22 are incorporated in the representation of the respective baths for circulating the bath to sprayers which are also illustrated pictorially above the bath representations. A representation 126 of the pH sensor 32 is included in the bath representation 108, representations 127 and 128 of pH and fluoride sensors 40 and 41 are illustrated in the representation 109 of the cleaning bath, a representation 129 of the pH sensor 61 is included in the rinse bath representation 110, a representation 130 of the pH sensor 71 is included in the treatment bath representation 111, a representation 131 of the conductivity sensor 81 is included in the rinse bath representation 112, and a representation 132 of the conductivity sensor 91 is included in the recirculating DI bath representation 113. The preclean bath representation 108 additionally includes valve representations 136 and 137 for cleaner and rinse water flow control valves, the clean bath representation 109 includes storage drum representations 139 and 140 together with chemical pump illustrations 141 and 142 for the respective acid and fluoride chemical storage and feeding facilities to the cleaning stage, the treatment bath representation 111 includes a representation 144 of a supply drum, and a representation 146 of a chemical pump for pumping treating chemical from the drum 144.

Figure 2:
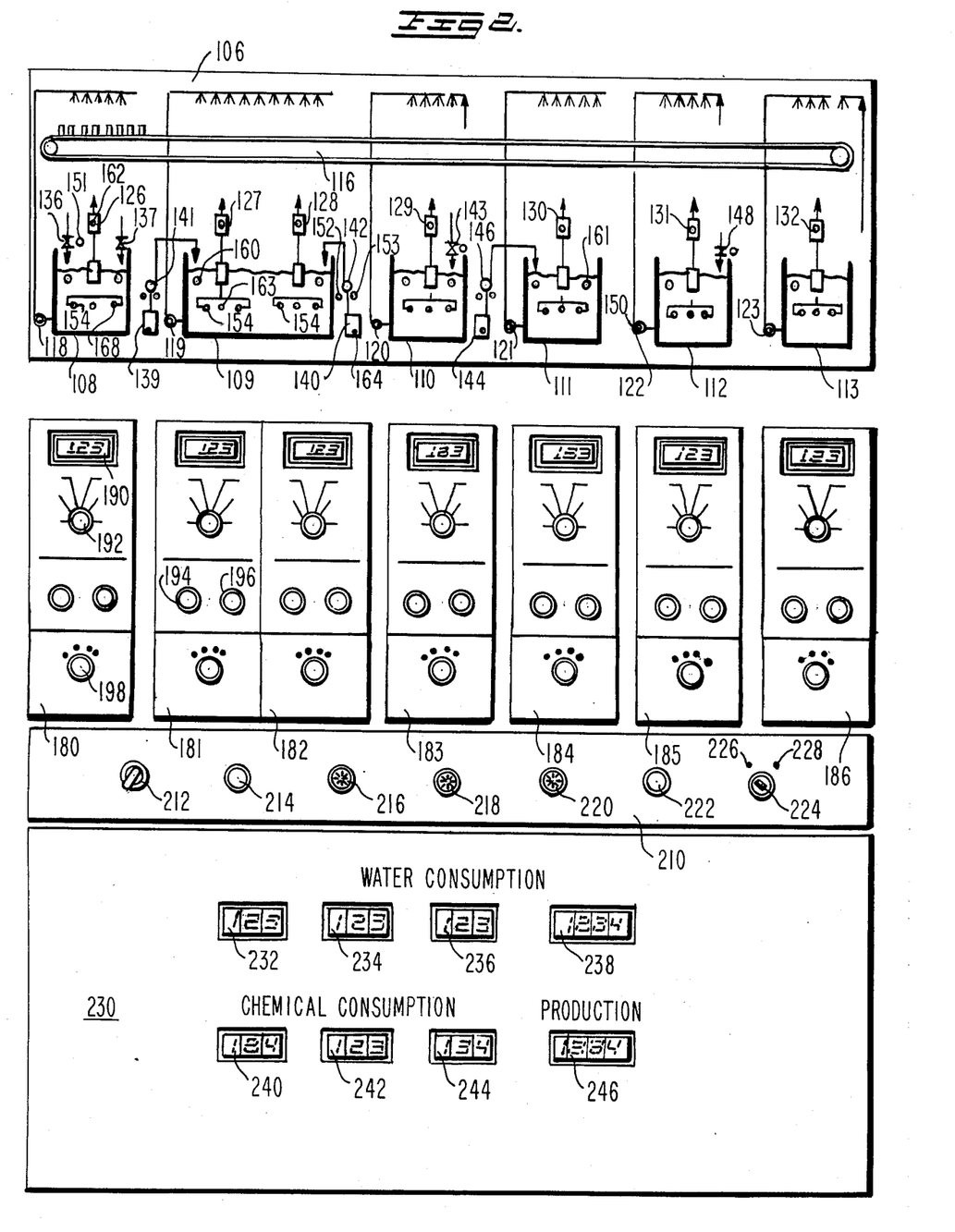
FIG. 2 is an enlarged front view of a control panel of the apparatus of FIG. 1.

Incorporated within each bath representation 108–113 are a plurality of light indicators, some of which indicate status conditions and others of which indicate warning or alarm conditions. Status condition LED's, which are turned on to indicate a true condition, include LED's 150 disposed within the respective circulation pumps 118–123 for indicating operation thereof, LED's 151 disposed adjacent the respective valve representations 136, 143 and 148 indicating operation thereof, LED's 152 and 153 disposed adjacent the chemical pump representations 141, 142 and 146 indicating operation of the corresponding chemical pump and blend times, respectively, and LED's 154 disposed within the respective bath representations 108–113 and associatively indicated relative to the corresponding conductivity, pH and fluoride sensor representations for indicating an acceptable bath concentration. Warning light indicators, which are flashed or blinked when on, include LED's 160 disposed within each respective bath representation 108–113 below the top bath level for indicating a low bath level, LED's 161 disposed within the respective baths 108, 109 and 111 for indicating an excessive bath temperature, LED's 162 disposed within the sensor representations 126–132 for indicating sensor malfunction, and LED's 163 disposed within the corresponding baths 108–113 and associatively depicted relative to the respective sensors 126–132 for indicating a weak bath concentration. Alarm LED's 168, which are blinked or flashed along with horn and beacon operation, are disposed within each of the baths 108–113 and associatively illustrated with respect to the sensors 126–132 for indicating that the bath concentration is out of an acceptable range. The beacon 104 and the alarm 102 are also operated when a drum empty condition is sensed, a temperature error is sensed, a sensing system error, a bath low level, or a flow error is sensed. The pictorial representations 108-113 also contain wording identifying the particular bath as well as identifying the particular display function of the LED's to supplement the identification of the function.

A horizontal array of display and manual control or selecting units 180, 181, 182, 183, 184, 185 and 186 is positioned immediately below the array of pictorial representations 108-113. The units 180-186 correspond to the bath representations 108-113 and are directly aligned vertically with respect thereto to clearly indicate the relationship therebetween; since the cleaning bath 109 contains a dual set of controls, i.e., acid and fluoride controls, two of the control units 181 and 182 pertain to the bath 109 with the respective acid and fluoride control units being positioned vertically below representations in the bath 109 of the respective acid and fluoride controls. Each control unit 180-186 includes a three digit numerical display 190, a ten position BCD selector switch 192 for selecting values to be displayed on the display 190, a pair of push button switches 194 and 196 for incrementing and decrementing set point values and a four position selector or switch 198 for selecting a mode. The three digit display indicates a numerical value of the variable or constant selected by the display select switch 192. The value displayed is in engineering units, (i.e., pH units, micro-Siemens, etc.). Where indicated on the display select switch label, a multiplier must be applied to the display value.

The ten positions of each display select switch 192 indicates variables, constants, blank spaces, D or M. control unit including the set point of the pH, fluoride or conductivity; high alarm set point; low alarm set point; feed time; and blend time. Not all control units have every function; for example, only control units 181, 182 and 184 have feed and blend time intervals that can be set, and the control unit 186 for deionized water only has a high alarm set point in addition to the variable display position of its display select switch 192. In addition, all of the display select switches 192 have a position D used for diagnostics, and the switches in units 180, 181, 183 and 184 have M positions for setting midpoints of the pH range. The display select positions are set forth in Table I.

Each mode select switch 198 has four positions, standby, monitor, time cycle, and auto. When in the standby mode, a control unit disables all functions controlling equipment to prevent operation of the corresponding bath. All power is removed from the corresponding LED's associated with that control unit and bath. The three digit display is blank except for the decimal point. In the monitor mode, the digital display 190 and the LED's are operated in accordance with the switch 192 and monitored conditions. The pumps, solenoids and alarms for that particular control unit remain inoperative. In the timed cycle, a control unit switches operation of the corresponding bath to a conventional cam timer (not shown) that periodically activates the corresponding valve, pump or solenoid. The cam timer is set to replenish the bath at a rate approximating the average chemical consumption. The alarm beacon and horn are inactive in this mode as are the blend, OK, weak and high alarm and sensing system error LED's in the graphics panel. In the auto mode, the bath is controlled under normal operating conditions and all systems are active.

TABLE I

| pH Chemical Control | Fluoride Chemical Control | Conductivity Chemical Control | Conductivity Control of Fresh Water Rinse | Conductivity Alarming of D.I. Water | pH Control of Fresh Water Rinse |
| --- | --- | --- | --- | --- | --- |
| Blank | Blank | Blank | Blank | Blank | Blank |
| Bath pH | Bath Fluoride Activity mV × 100 | Bath Conductivity MilliSiemens × 10 | Bath Conductivity MicroSiemens × 100 | Blank | Bath pH |
| pH Set point | Fluoride Activity Set Point mV × 100 | Conductivity Set Point MilliSiemens × 10 | Conductivity Set Point MicroSiemens × 100 | Blank | pH Set Point |
| Concentration High Alarm Set Point | Fluoride High Alarm Set Point | Concentration High Alarm Set Point | Contamination High Alarm Set Point | Bath Conductivity MicroSiemens × 10 | Contamination High Alarm Set Point |
| Concentration Low Alarm Set Point | Fluoride Low Alarm Set Point | Concentration Low Alarm Set Point | Contamination Low Alarm Set Point | Conductivity High Alarm Set Point | Contamination Low Alarm Set Point |
| Chemical Feed Time Minutes × 10 | Chemical Feed Time Minutes × 10 | Chemical Feed Time Minutes × 10 | Blank | Blank | Blank |
| Chemical Blend Time Minutes × 10 | Chemical Blend Time Minutes × 10 | Chemical Blend Time Minutes × 10 | Blank | Blank | Blank |
| Blank | Blank | Blank | Blank | Blank | Blank |
| D | D | D | D | D | D |
| M | Blank | Blank | Blank | Blank | M |

Variables are the values being read from the bath sensing devices, such as the bath pH sensors, bath fluoride sensors, or bath conductivity sensors. Only one variable is usually displayed per control module. For control units 185 and 186, this variable is conductivity, for units 180, 181, 183 and 184, this variable is bath pH and for control unit 182, this bath variable is bath fluoride. Constants are values that are entered into the controller by the operator. There are usually five constants per control unit and bath. When the mode select switch is not in standby for units 180, 181, 182, 183, 184, 185 and 186 and the display select switch 192 selects the desired display value which is desired to be set or changed, pressing of button 194 will increase the display or set point value and pressing button 196 will decrease the display or set value.

Below the horizontal array of control units 180–186, there is mounted a main control plate 210 which contains a main power on/off switch 212, a lamp test push button switch 214, a processor error indicator light 216, a high cabinet temperature indicator light 218, a low battery indicator light 220, a horn and beacon acknowledge push button switch 222 and a display function select key switch 224. The main power switch 212 controls all external power to the controller. When this switch is in the off position, all outputs are disabled except that power is maintained to the processor. The processor includes its own battery to retain set points which have been entered in the event of power disruption. The lamp test push button is used to test the LED's and indicator lights when the mode select switches are in the standby position. The processor error light 216 indicates when there is a problem with the central processing unit of the controller. The high cabinet temperature light indicates when the internal temperature of the cabinet is too high and is set at a suitable point, such as 50° C., to avoid operation of the controller circuitry at a temperature above its safe operating temperature. The low battery light indicates when the memory backup battery for the controller is in need of replacement. The horn acknowledge push button switch 222 is used to turn the horn off. When an alarm condition developes, the horn sounds and the beacon flashes, and the button 222 can be depressed to turn off the horn and the beacon. The corresponding flashing LED lamp in the graphics panel 106 continues to flash until the problem is corrected. The display function select key switch 224 is used to enable set points to be changed. This switch is normally left in its "Display Setpoints and Variables" position where the display set push button switches 194 and 196 are disabled thus enabling only display of the set point and variable values on the displays 190. To change a setpoint, the key must be inserted in the display function select key switch 224 and the switch turned to the "Change Setpoints" position where the set points can be stepped up or down by the switches 194 and 196.

An optional supplemental display panel 230 is mounted below the main control panel 210. The display panel 230 contains additional digital displays such as display 232 indicating the quantity of fresh water consumed, display 234 indicating the quantity of effluent discharged, display 236 indicating the quantity of fluid backflow, display 238 indicating the weekly or monthly consumption of fresh water, display 240 indicating the quantity of consumption of a first chemical, display 242 indicating the quantity of consumption of a second chemical, display 244 indicating quantity of consumption of a third chemical, and display 246 indicating the total number of cans passed through the processing line. The displays may be reset daily, weekly or monthly or on varied schedules in accordance with the operator's wishes.

Figure 3:
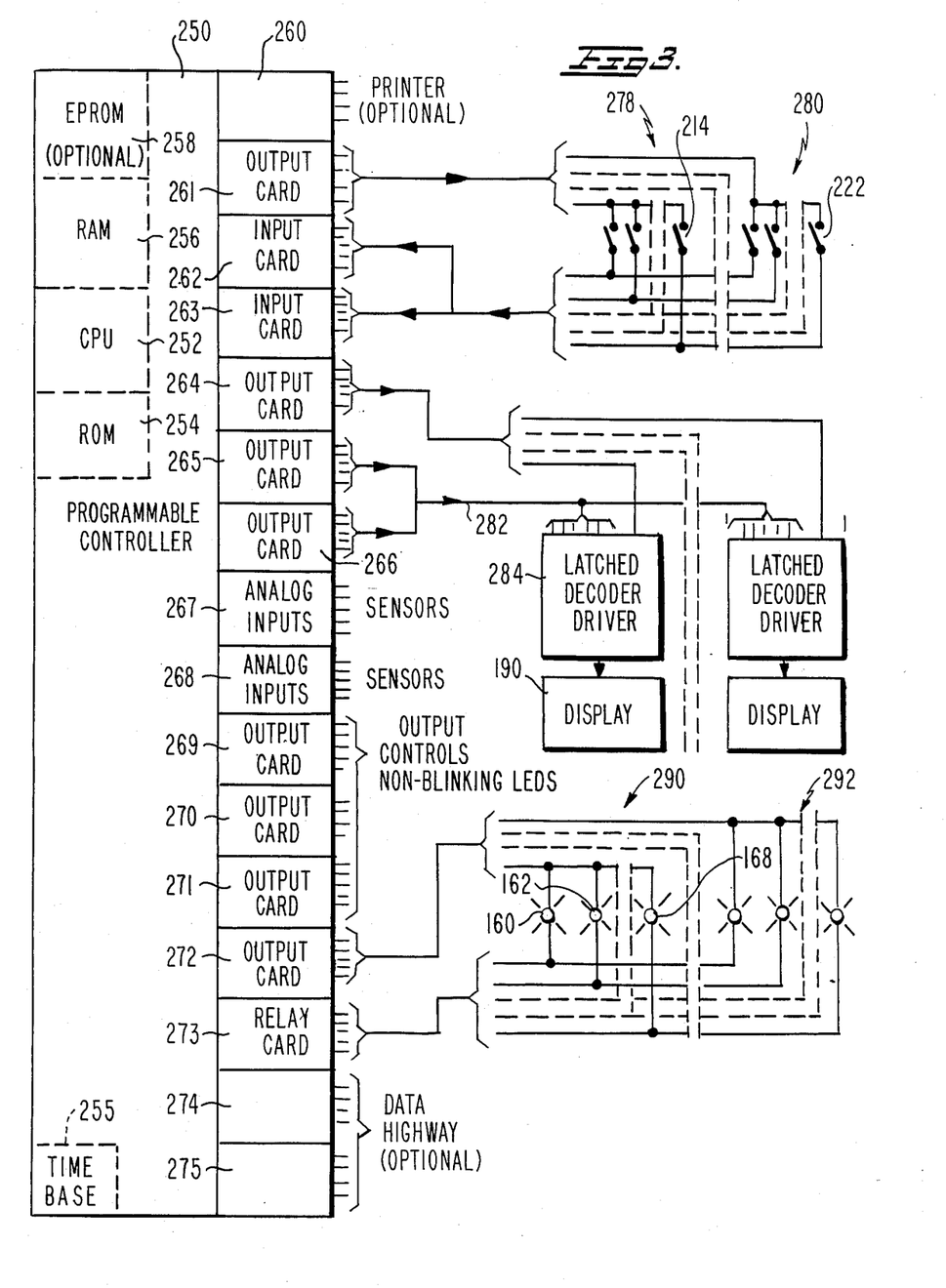
FIG. 3 is a block diagram illustrating circuitry representative of the circuitry utilized in the apparatus of FIG. 1.

The electrical circuitry for the bath controlling system is illustrated in FIG. 3, and includes a programmable controller 250 such as Model Mini-PLC-2/15 from Allen-Bradley Company, 747 Alpha Drive, Cleveland, Ohio 44143. The programmable controller includes a central processing unit or microprocessor 252 which is operated under the control of an operating system program stored within read only memory (ROM) 254. The programmable controller additionally includes a time base 255 and a random access memory (RAM) 256 where user program instructions and data are stored and utilized, portions of the RAM are utilized by the operating system program under user program control for input and output tables, timers, and counters. An erasable programmable read only memory 258 is optionally included to store the program instructions and starting point data for transfer to the RAM during start up after loss of power or disconnection. The controller 250 can include up to sixteen cards 260–275 each of which may have eight inputs or outputs or a mixture of inputs and outputs for a total maximum of 128 inputs and outputs.

In order to enable more than 128 inputs and outputs, program controlled multiplexing techniques are provided. Outputs from card 261 are connected to respective common junctions of one sides of seven respective groups of sensing switches, only two groups illustrated generally at 278 and 280 in FIG. 3. The groups define respective channels which generally correspond to the seven control units 180–186 of FIG. 2; i.e., the sensing switches in each group conveniently are associated with a respective control unit or bath but some switches for some control units having a large number of sensing switches may be in another channel associated with a bath or control unit having only a small number of sensing switches. Each group of switches includes the four contact pairs of the corresponding BCD switch 192, the contact pairs of the corresponding display set switches 194 and 196 and three of the contact pairs of the corresponding mode select switch 198 (the other position of switch 198 is determined by the absence of the other three contacts) of the corresponding channel control unit 180–186 (only one contact 192 being illustrated as an example in FIG. 3. Additionally, sensing switches in each of the stages, such as the circulation sensing switch 33 are included in each corresponding group, or another group if the corresponding channel is full. The master control switches 214, 222 and 224 are connected in any group or channel with available space. The opposite side of each switch in the groups of switches is connected together with the corresponding switch in each of the other groups to a respective input of input cards 262 and 263. Thus the switches in the control units 180–186, the switches in the master control panel 210 and the sensing switches in the baths 12, 14, 16, 18, 20 and 22 are connected in a switch matrix.

Output cards 265 and 266 form a data bus 282 which is connected in common with data inputs of latched decoded drivers 284 which operate the digital displays 190 of the control units 180–186. Outputs of the output card 264 are connected to the enable or gate control inputs of the respective latched circuits 284 to select the latched driver 284 into which the information on bus 282 is to be stored. Only two of the seven latched drivers 284 and displays 190 are shown in FIG. 3.

The warning and alarm LED's in the graphics display of panel 106 are arranged in a matrix wherein seven groups of the blinking LED's (only two groups are indicated generally at 290 and 292 in FIG. 3) each have one side thereof connected to a respective output of the output card 272 for selecting operation of that group. Each LED in each group is connected on its other side together with the corresponding LED's in the other groups to a respective terminal of a relay card 273 which has the opposite side of each relay therein connected to ground. Conveniently, the LED's in each group are selected to correspond to a respective control unit of the units 180–186 and the processes depicted thereabove in panel 106. The corresponding LED of each of the groups as selected by the relay card 273 is activated only when the corresponding channel, or group, is selected by the output card 272. Since the channels are cyclically selected, as explained below, over a period of about one second, the LED will flash during its selection and be off for the period of selection of other groups.

Analog inputs are connected to analog input cards 267 and 268. Control outputs and outputs to non-blinking LED's are provided by outputs of output cards 269, 270 and 271 as well as any remaining outputs from the output cards utilized in the multiplexing. Additional cards 260, 274 and 275 may be provided for connecting a printer or another computer to the controller 250.

Figure 4:
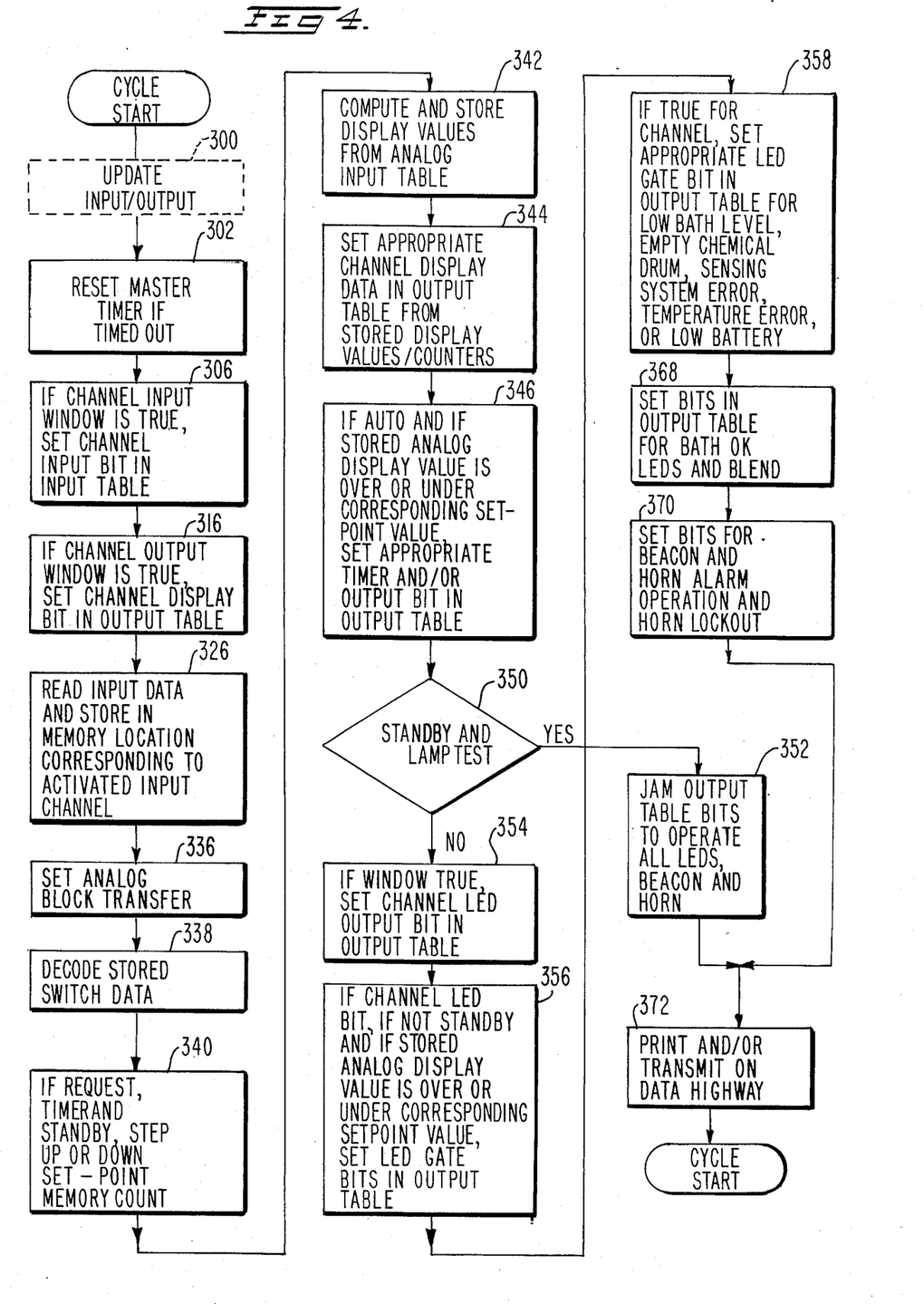
FIG. 4 is a flow chart of a program for operating the programmable controller of the circuitry of FIG. 3.

Operation of the controller and thus the apparatus can be understood from the program as illustrated in FIG. 4. The operating system of the controller, during normal operation, continuously cycles through the instructions which have been programmed into the RAM 256. At the start of each cycle, the operating system will first read data from all inputs and place this data in a corresponding location within RAM 256 called an input table. After inputting data into the input table, the operating system will operate the outputs in accordance with data that is stored within an output table in RAM 256. This operating system procedure which occurs every cycle is illustrated by the step 300 in FIG. 4. Also in the step 300, any memory location that has been set up as a timer will be updated to the corresponding absolute time value referenced from the turn on of the timer until the timer reaches its maximum value whereat time elapsed bits are accordingly set. After updating the actual inputs and outputs of the cards as well as the timer readings, the operating system will sequentially go through the program instructions contained within RAM to perform the operation thereof. It is noted that in the program instructions, inputs and outputs are performed by reading or writing corresponding bits in the input or output table portion of RAM 256.

In the first step 302, the program calls for the reset of the master timer if it has timed out. As shown for timing line 304 in FIG. 5, the master timer is set to operate for a period of about 900 milliseconds before timing out and being reset during the subsequent update. From step 302, the program proceeds to step 306 where channel input windows are determined, and if true, are utilized to set the corresponding channel bit in the output table controlling the output card 261. The channel input windows correspond to specific timing ranges of the master timer 304 as illustrated by the timing marks 308, 309, 310, 311, 312, 313 and 314 in FIG. 5. In step 316, output windows are set by setting the memory table output corresponding to output card 264 when the master timer has a timing range as indicated by the respective timing marks 318, 319, 320, 321, 322, 323 and 324.

Figure 5:
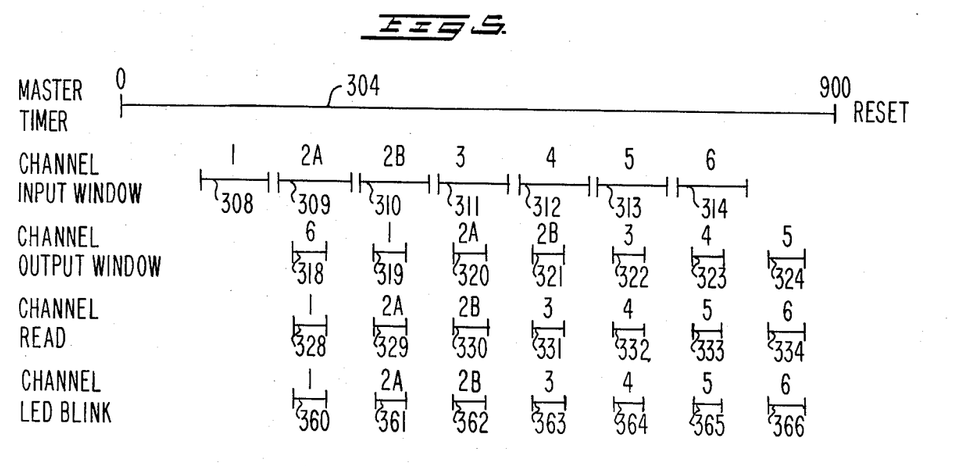
FIG. 5 is a graph of timing intervals illustrating operation of the apparatus and program for conveniently employing a multiple of inputs and outputs.

The input table locations corresponding to input cards 262 and 263 are read in step 326 during output windows 318–324 and stored into memory storage locations corresponding to the respective input channel. There is a delay in operation of the output card 261, passage of signals from output card 261 through corresponding switch groups 278 and 280 and operation of input card 262. The time difference between input window 308 and output window 318 corresponds to this delay time required for output card after receiving data selecting channel 1 to produce a signal on the corresponding output and for this signal to pass through the corresponding switches of switch bank 278 back to inputs of input cards 262 and 263, and for input cards 262 and 263 to operate to present channel 1 data for being read by the controller processor. Additionally, the timing window 318 is made narrower in time than the time window 308 in order to avoid timing variations and irregularities such as may be caused by line capacitance, cross talk, etc. on the output lines from card 261. Thus, as shown by timing marks 328, 329, 330, 331, 332, 333 and 334, each channel will be read during each cycle of the master timer. The duration of each of the windows 318–324 as well as each of the windows 308–314 are selected to be at least about equal to two or more cycles of the controller through the program to thus insure that input data for all channels is updated each cycle of the master timer. The output table corresponding to output card 264 is conveniently used for marking the reading windows or channel to avoid additional window tables for reading as well as output.

In the next step 336, analog block transfer functions are set. During the next operating system update step 300 in the next cycle, the analog inputs of cards 267 and 268 will be sequentially converted to digital data and stored in corresponding memory locations.

The stored switch input information is processed and decoded in step 338. For example, the data corresponding to each of the switches 192 is decoded from its BCD format and used to set a corresponding memory bit to indicate the particular function called for by the switch 192 for each channel.

Set point counter memory locations are stepped up or down in step 340 in accordance with depression of the corresponding display set switch 194 or 196 if the key switch 224 is in a position permitting the setting of set points. Additionally, the mode switch must be in the timed cycle monitor, or auto position for the units 180, 181, 182, 183, 184, 185 and 186. The program contains fast and slow timers which determine the rate of step up and step down; the fast timer is operated by depressing the horn acknowledge button 222 when a push button 194 or 196 is operated.

The digital analog values which are stored in memory from the reading of the analog cards are processed in step 342 to convert the read values to appropriate values corresponding to engineering units desired to be displayed. The stored digital analog readings may be multiplied or divided and may be adjusted by an offset to provide the appropriately scaled value for the display. This new computed value is then stored within yet another corresponding memory location. In the subsequent step 344, the appropriate channel display value selected in accordance with an output channel window 318–324 and in accordance with the function called by the corresponding switch 192, is passed to the memory output table corresponding to output cards 265 and 266. It is noted that the same channel output windows 318–324 are utilized for output cards 264, 265, and 266 since similar delays of the output cards result in the data on data buss 282 from cards 265 and 266 and the enabling bit from card 264 being applied to drivers 284 at the same time. Further, the display for each corresponding channel is selected to be one window behind the read channels 328–334 so that the displayed data will correspond to data read during the previous window.

In step 346, the outputs controlling the process are operated. If the values detected by sensors 126–132 indicate the need for fresh water, acid, flouride or treating chemical and the corresponding mode switch 198 is in the auto mode, then a corresponding timer in RAM is set and the corresponding valve 137, 143 or 148, or pump 141, 142 or 146 is operated by energizing the corresponding output from cards 269, 270 and 271 for the period of the corresponding timer.

If all the mode switches 198 are in the standby mode and the lamp test switch 214 is depressed, then in step 350 the program will jump to step 352 where the outputs for all the LED's are rendered high to turn all the lamps or LED's 150, 151, 152, 153, 154, 160, 161, 162, 163, 164, 168 and 220 ON. The alarm and warning condition LED's will be on continuously rather than blinking. Thus the LED's and lamps can be tested.

When step 350 is false, the program proceeds to step 354 where an output bit in the memory table for output card 272 is set during the corresponding blinking LED channel 360, 361, 362, 363, 364, 365 and 366 which are determined from the bits indicating windows 318-324. In the illustrated example, each LED channel, corresponding to the respective control unit 180-186, is selected to be the same as the read channel 328-334; however, the channel need not be the same but may be delayed such as for the display output channels 318-324. In step 356, alarm and weak bath condition bits set in previous step 346 corresponding to the appropriate LED window are passed on to the output table which controls relay card 273 during the corresponding LED channel window 360-366 of step 354. In step 358, conditions read in the step 326 corresponding to low bath level (LED's 160), empty chemical drum (LED's 164), sensing system error (LED's 162), or temperature error (LED's 161) are passed on to the output table corresponding to relay card 273.

In steps 356 and 358, the LED's are only lit or operated for the short time that the channel is true during a complete timing period 304. This results in a flashing or blinking of the corresponding LED's to indicate a warning or alarm condition. It is noted that the timing periods for the acceptable channels are separated by sufficient time to allow voltages on transmitting lines to decrease and increase to thus avoid cross talk or coupling between lines which could produce flickering or false activation of LED's.

In the following step 368, bits are set in the output table for output cards 269, 270 and 271 corresponding to LED's which indicate non-warning or non-alarm conditions such as bath ok (LED's 154), feed pump on (LED's 152), circulation pump on (LED's 150), valve on (LED's 151), and blend cycle on (LED's 153). Additionally the battery low bit operating LED 220 may be set in an extra output such as from card 272.

The existence of a true for an alarm condition from any of the alarm values from any of the channels together with the absence of a lock-out for that particular condition results in a beacon/horn timer being activated which in turn causes the appropriate bit to be rendered high in the output table corresponding to the horn operation. The initiation of an alarm condition in step 370 causes the horn and beacon to be operated until horn acknowledge button 222 is depressed whereupon the lockout bit is set for that particular alarm condition. This prevents resetting of the horn timer causing the horn and beacon to be turned off. Correction and subsequent removal of the alarm condition bit will result in resetting of the lockout bit to enable subsequent alarms for that condition to operate the horn and beacon. Each alarm condition has its own lockout bit so that acknowledgement of one alarm condition will not be effective to acknowledge other alarm conditions which may subsequently appear; thus, each new alarm condition must be acknowledged separately to turn off the horn and beacon.

From either step 352 or step 370, the program proceeds to step 372 where any printing and/or data transfer to associated computers takes place, if the system is so designed. Printers and data highway connections to other computers through cards 260, 274 and 275 are optional.

At the end of the last step, the operating system automatically returns to the cycle start to thus continuously cycle through the program steps.

The above-described embodiment describes a system employing seven channels. However, systems with less than seven channels can be designed; for example, a system only controlling a cleaning bath 14 and a treatment bath 18 utilizing three channels can be used where pre-cleaning is not controlled and the rinsing and washing steps are not monitored or controlled for the particular washer. Additionally, the above-described apparatus and process utilizes a pH sensor 71 in the treatment bath 18. A conductivity sensor can be substituted for the pH sensor where appropriate for the particular treatment bath. The temperature sensors 31, 42 and 72 may be either analog sensors wherein high alarm values are set in the same manner as for the pH and conductivity sensors, or the temperature sensors may be simple temperature operated switches which are sensed in the same manner as the control switches.

In the accompanying appendix, there is listed a program for one embodiment of a can treating process. The program is in ladder diagram for an Allen-Bradley programmable controller model MINI-PLC-2/15.

Since many modifications, variations and changes in detail may be made to the above-described embodiment, it is intended that all matter described above and shown in the accompanying drawings be interpreted as illustrative and not in a limiting sense.

What is claimed is:

1. An apparatus for controlling a process comprising:
a programmable controller including a plurality of inputs, first and second pluralities of outputs, memory means including data storage means and program means with a series of program instructions, and means for continuously cycling through the series of program instructions;
at least two groups of pluralities of condition means, each condition means having conductive and non-conductive states for indicating a condition;
each group of condition means having one sides of its condition means connected together to a respective output of the first plurality of outputs;
each respective condition means of each group of condition means having its other side connected together with the corresponding condition means of each other group to a respective input of the plurality of inputs;
said program means including channel selecting means for sequentially selecting respective channel windows to sequentially energize corresponding outputs of the first plurality of outputs during the channel windows wherein each channel window extends for a duration at least equal to one cycle through the series of program instructions, reading means for reading data from the inputs and storing the data in the data storage means at memory locations corresponding to the respective selected channel windows during continuous cycling of the program means, processing means for processing the stored data, and output means for selectively operating the second plurality of outputs; and process control means responsive to the second plurality of outputs for controlling the process.

2. An apparatus as claimed in claim 1, wherein said programmable controller includes programmable timing means; and said channel window selecting means includes means for resetting the timing means after a period corresponding to a number of program cycles at least equal to the number of groups of pluralities of condition means, and means for determining a timing value of the timing means between preset beginning and ending timing values for each of the corresponding channel windows for selecting the respective channel windows wherein the preset timing periods for each window are mutually exclusive.

3. An apparatus as claimed in claim 2, wherein said reading means includes second channel selecting means for determining a timing value of the timing means between preset second beginning and ending timing values defining second channel windows which are related in time to the first channel windows in accordance with a delay in the first outputs, the condition means and the inputs; said reading means being such that the reading and the storing of data is only during the corresponding second channel windows.

4. An apparatus as claimed in claim 3, wherein the second channel windows have periods which are substantially less than the periods of the first channel windows and are related thereto so as to avoid irregularities at beginning and ending portions of each first channel selecting window.

5. An apparatus as claimed in claim 4, including at least two groups of pluralities of light indicators for indicating warning conditions; and wherein the programmable controller includes a third plurality of outputs each connected to a common junction of one sides of the light indicators of a respective group of the light indicators, the programmable controller further includes a plurality of switching output means each connected in series with a common junction joining the other side of a respective light indicator of each group of light indicators to the corresponding light indicator of each other group, and the program means includes means operated during the second channel windows for operating the respective third outputs and the output switching means to blink the corresponding light indicators to indicate warning conditions.

6. An apparatus as claimed in claim 5 including a plurality of numerical displays and corresponding latched driver circuits therefor, the latched driver circuits each having parallel data inputs and an enable input; wherein the programmable controller includes fourth and fifth pluralities of outputs, the fourth plurality of outputs being connected in parallel to data inputs of the latched driver circuits for the displays, and the fifth plurality of outputs being connected to respective enable inputs of the latched driver means; and wherein the program means includes means for operating the fifth outputs in sequence corresponding to the second channel windows, and means for sequentially presenting corresponding data on the fourth outputs.

7. An apparatus for treating metal articles comprising:

a plurality of liquid baths including a cleaning bath and a treating bath;

means for transporting the articles through the baths;

a plurality of control units corresponding to respective baths for controlling operational parameters of the respective baths;

each control unit including a plurality of switch means for selecting desired bath operating conditions;

a programmable controller including a plurality of inputs, first and second pluralities of outputs, memory means including data storage means and program means with a series of program instructions, and means for continuously cycling through the series of program instructions;

said first plurality of outputs being connected to respective common junctions of one side of respective groups of the pluralities of switch means of the control units;

said inputs each being connected to a respective common junction joining the other sides of a corresponding switch means of each group with the coresponding switch means of each other group;

said program means including channel selecting means for sequentially selecting respective channel windows to sequentially energize corresponding outputs of the first plurality of outputs during the channel windows wherein each channel window extends for a duration at least equal to one cycle through the series of program instructions, reading means for reading data from the inputs and storing the data in the data storage means at memory locations corresponding to respective selected channel windows during continuous cycling of the program means, processing means for processing the stored data, and output means for selectively operating the second plurality of outputs; and bath control means responsive to the second plurality of outputs for controlling parameters of the baths.

8. An apparatus as claimed in claim 7, wherein said programmable controller includes programmable timing means; and said channel window selecting means includes means for resetting the timing means after a period corresponding to a number of program cycles at least equal to the number of groups of pluralities of condition means, and means for determining a timing value of the timing means between preset beginning and ending timing values for each of the corresponding channel windows for selecting the respective channel windows wherein the preset timing periods for each window are mutually exclusive.

9. An apparatus as claimed in claim 8, wherein said reading means includes second channel selecting means for determining a timing value of the timing means between preset second beginning and ending timing values defining second channel windows which are related in time to the first channel windows in accordance with a delay in the first outputs, the condition means and the inputs; said reading means being such that the reading and the storing of data is only during the corresponding second channel windows.

10. An apparatus as claimed in claim 9, wherein the second channel windows have periods which are substantially less than the periods of the first channel windows and are related thereto so as to avoid irregularities at beginning and ending portions of each first channel selecting window.

11. An apparatus as claimed in claim 10, including at least two groups of pluralities of light indicators for indicating warning conditions; and wherein the programmable controller includes a third plurality of outputs each connected to a common junction of one sides of the light indicators of a respective group of the light indicators, the programmable controller further includes a plurality of switching output means each connected in series with a common junction joining the other side of a respective light indicator of each group of light indicators to the corresponding light indicator of each other group, and the program means includes means operated during the second channel windows for operating the respective third outputs and the output switching means to blink the corresponding light indicators to indicate warning conditions.

12. An apparatus as claimed in claim 11 including a plurality of numerical displays and corresponding latched driver circuits therefor, the latched driver circuits each having parallel data inputs and an enable input; wherein the programmable controller includes fourth and fifth pluralities of outputs, the fourth plurality of outputs being connected in parallel to data inputs of the latched driver circuits for the displays, and the fifth plurality of outputs being connected to respective enable inputs of the latched driver means; and wherein the program means includes means for operating the fifth outputs in sequence corresponding to the second channel windows, and means for sequentially presenting corresponding data on the fourth outputs.

13. An apparatus for controlling a metal-treating process which includes a plurality of liquid baths for contacting metal articles being treated, the apparatus comprising:
- a programmable controller having first and second pluralities of inputs and first and second pluralities of outputs;
- a plurality of condition sensing means connected to the first inputs of the controller for sensing conditions associated with the baths;
- a plurality of control means connected to the first plurality of outputs for controlling parameters of the baths;
- a control and display panel means including a horizontal array of manually operable control units wherein at least one control unit is associated with each bath, the control units including a plurality of control switches connected to the second inputs, a horizontal array of designs depicting the baths and the process and being spatially associated with the array of control units wherein the designs depicting the baths are clearly associated with the corresponding control units, and a plurality of groups of bath light indicators connected to the second outputs wherein each group of light indicators is incorporated within the respective bath design, each bath design having identifying means for each light indicator incorporated therein; and
- said programmable controller including program means responsive to the first and second inputs for operating the first and second outputs to control the baths and to operate the light indicators to display sensed conditions.

14. An apparatus as claimed in claim 13 wherein the program means includes a series of program instructions; the programmable controller includes memory means with data storage means, and means for continuously cycling through the series of program instructions; the first plurality of outputs are connected to respective common junctions of one sides of respective groups of the plurality of switch means of the control units; the second inputs each are connected to a respective common junction joining the other side of a corresponding switch means of each group with the corresponding switch means of each other group, the program means further includes channel selecting means for sequentially selecting respective channel windows to sequentially energize corresponding outputs of the first plurality of outputs during the channel windows wherein each channel window extends for a duration at least equal to one cycle through the series of program instructions, reading means for reading data from the inputs and storing the data in the data storage means at memory locations corresponding to respective selected channel windows during continuous cycling of the program means, and processing means for processing the stored data.

15. An apparatus as claimed in claim 14, wherein said programmable controller includes programmable timing means; and said channel window selecting means includes means for resetting the timing means after a period corresponding to a number of program cycles at least equal to the number of groups of pluralities of condition means, and means for determining a timing value of the timing means between preset beginning and ending timing values for each of the corresponding channel windows for selecting the respective channel windows wherein the preset timing periods for each window are mutually exclusive.

16. An apparatus as claimed in claim 15, wherein said reading means includes second channel selecting means for determining a timing value of the timing means between preset second beginning and ending timing values defining second channel windows which are related in time to the first channel windows in accordance with a delay in the first outputs, the condition means and the inputs; said reading means being such that the reading and the storing of data is only during the corresponding second channel windows.

17. An apparatus as claimed in claim 16, wherein the second channel windows have periods which are substantially less than the periods of the first channel windows and are related thereto so as to avoid irregularities at beginning and ending portions of each first channel selecting window.

18. An apparatus as claimed in claim 17, including at least two groups of pluralities of light indicators for indicating warning conditions; and wherein the programmable controller includes a third plurality of outputs each connected to a common junction of one sides of the light indicators of a respective group of the light indicators, the programmable controller further includes a plurality of switching output means each connected in series with a common junction joining the other side of a respective light indicator of each group of light indicators to the corresponding light indicator of each other group, and the program means includes means operated during the second channel windows for operating the respective third outputs and the output switching means to blink the corresponding light indicators to indicate warning conditions.

19. An apparatus as claimed in claim 18 including a plurality of numerical displays and corresponding latched driver circuits therefor, the latched driver circuits each having parallel data inputs and an enable input; wherein the programmable controller includes fourth and fifth pluralities of outputs, the fourth plurality of outputs being connected in parallel to data inputs of the latched driver circuits for the displays, and the fifth plurality of outputs being connected to respective enable inputs of the latched driver means; and wherein the program means includes means for operating the fifth outputs in sequence corresponding to the second channel windows, and means for sequentially presenting corresponding data on the fourth outputs.

20. A process for controlling a plurality of process control devices in accordance with a plurality of control switch means, comprising the steps of:
continuously cycling through a series of program instructions in a programmable controller;
resetting a timer when the timer reaches a count corresponding to a plurality of cycles of the controller through the series of program instructions;
determining, during each cycle, if the timing value of the timing means is between corresponding pairs of beginning and ending preset timing values to determine respective channel windows;
energizing respective first outputs of the controller only during corresponding channel windows to energize respective junctions joining sides of respective groups of the plurality of switch means;
reading inputs of the controller, each input connected to a respective junction joining the other side of a corresponding switch means of each group with each corresponding switch means of each other group, only during corresponding channel windows;
storing the read data into memory locations corresponding to the respective channel windows;
processing the stored data; and
energizing selected second outputs of the controller to operate process control devices controlling the process in accordance with the processed data.

21. A process as claimed in claim 20 wherein the determining of respective channel windows includes determining first channel windows during which the respective outputs are energized, and determining second channel windows during which the inputs are read and the data are stored in the respective memory locations, said second channel windows being delayed from the corresponding first channel windows in accordance with delay time in the outputs, the switch means and the inputs.

22. A process as claimed in claim 21 wherein the second channel windows have durations substantially less than the durations of the first channel windows so as to avoid irregularities at beginning and ending portions of the first channel windows.

23. A process as claimed in claim 20 including energizing respective third outputs in accordance with the channel windows to energize respective junctions each connected to one sides of a respective group of warning light indicators for the process, and selectively energizing a plurality of switch means each connected in series with a junction joining the other side of a respective light indicator of each group to the corresponding light indicator of each other group to indicate warning conditions derived during the processing of the stored data.

24. A process as claimed in claim 23 including energizing respective fourth outputs of the controller connected to enable inputs of respective digital display means during the corresponding channel windows, and presenting corresponding data on data outputs of the controller connected to data inputs of the digital display means.

* * * * *